United States Patent [19]

Kaufmann et al.

[11] Patent Number: 5,454,704
[45] Date of Patent: Oct. 3, 1995

[54] PACKING SHEET CALENDER AND PROCESS FOR THE PRODUCTION OF PACKING SHEETS

[75] Inventors: Reinhold Kaufmann, Eschwege; Hans F. Ramm, Hemmingen, both of Germany

[73] Assignee: Paul Troester Maschinenfabrik, Hanover, Germany

[21] Appl. No.: 88,161

[22] Filed: Jul. 7, 1993

[30] Foreign Application Priority Data

Jul. 7, 1992 [DE] Germany .................. 42 22 241.9

[51] Int. Cl.6 ............................................. B29C 35/08
[52] U.S. Cl. .................... 425/74; 425/75; 425/174.4; 425/210; 425/363
[58] Field of Search ................... 425/74, 75, 143, 425/174.4, 210, 363

[56] References Cited

U.S. PATENT DOCUMENTS

| | | | |
|---|---|---|---|
| 1,504,183 | 8/1924 | Conger et al. ............... | 425/75 |
| 2,201,747 | 5/1940 | Staudt ........................ | 425/75 |
| 2,259,355 | 10/1941 | Sebrell ....................... | 425/75 |
| 3,210,447 | 10/1965 | Cyr et al. ................... | 425/174.4 |
| 3,271,504 | 9/1966 | Bergstrom et al. ......... | 425/363 |
| 3,444,289 | 5/1969 | Hedberg et al. ........... | 425/363 |
| 3,564,656 | 2/1971 | Barnett ....................... | 425/174.4 |
| 3,999,911 | 12/1976 | Matsubara ................... | 425/75 |
| 4,025,263 | 5/1977 | Morino et al. .............. | 425/363 |
| 4,605,366 | 8/1986 | Lehmann et al. ........... | 425/363 |

*Primary Examiner*—James P. Mackey
*Attorney, Agent, or Firm*—Emmanuel J. Lobato

[57] ABSTRACT

A packing sheet is formed on a calender having a rotatable large diameter heated cylinder and a rotatable smaller diameter unheated cylinder, with a gap between the cylinders, by feeding a preformed mixture of rubber material, fiber and solvent into the gap between the cylinders while the cylinders are rotating in opposite directions to form on the circumference of the large diameter cylinder a layer of progressively increasing thickness of the mixture during successive rotation of the cylinders. While the cylinders are thus rotating, heat from an external heat source is applied to the outer surface of the layer of material on the large diameter heated cylinder so that the material is heated both by heat from the large diameter heated cylinder and heat from the external heat source and is thereby vulcanized to form a cylindrical packing sheet. The cylinders are then stopped, the packing sheet is cut lengthwise of the cylinder and is stripped from the cylinder.

7 Claims, 3 Drawing Sheets

5,454,704

PACKING SHEET CALENDER AND PROCESS FOR THE PRODUCTION OF PACKING SHEETS

FIELD OF INVENTION

The invention relates to a packing sheet calender and to a process for the production of packing sheets on such calender in which a mixture of rubber, fibers and a solvent are fed into the gap between a large diameter cylinder heated by a fluid heating medium and a smaller pressure cylinder supported by calender stands and is built up in thin layers on the heated cylinder during many revolutions thereof and is vulcanized on the heated cylinder during continued revolution thereof.

BACKGROUND OF THE INVENTION

Packing sheets are produced on special calenders which have a large diameter cylinder heated by a heating medium and an unheated, usually cooled, pressure cylinder of smaller diameter. The large diameter of the heated cylinder is necessary in order to produce packing sheets economically. For the packing sheets are produced in a discontinuous process in which the previously mixed mixture of rubber material, fibers and solvent is fed into the gap between the cylinders and is built up in thin layers on the heated cylinder during many revolutions thereof. The layer of material thus built up on the heated cylinder is vulcanized by the heat of the heated cylinder and forms a hollow, cylindrical packing sheet. The diameter of the heated cylinder is, for example, 1300 mm or more and the length of the heated cylinder is, for example, 2000 mm. After completion of the vulcanization, the heated cylinder and the pressure cylinder are stopped and the layer of material on the heated cylinder is cut by a cut parallel to the axis of the heated cylinder to form a sheet whereupon one cut edge of the sheet is gripped and the sheet is drawn from the heated cylinder.

The previously used mixture of rubber material, asbestos fiber and a solvent can no longer be used. The substitute fibers presently available for the production of packing sheets are considerably more difficult to handle. The process parameters with respect to temperature and rate of rotation have become very critical. If they are not observed, defective products are produced. While previously packing sheets using asbestos fiber could be produced with the technical knowledge and ability of the machine operator, with the fibers used today and the constantly increasing technical requirements, the programming of the machine has become more complicated and requires the use of a microprocessor. Contributing to these difficulties is the fact that the mixture for the production of packing sheets has strong heat insulation properties so that during the build-up of the packing sheet, the heat insulation becomes greater as the sheet becomes thicker, with the result that the temperature of the outer surface of the sheet progressively decreases whereby vulcanization is retarded and becomes non-uniform. In order to obtain sufficient vulcanization of the outer layers, the duration of the work process and number of revolutions of the heated cylinder must be increased, which makes the process uneconomical. The solution of these problems places very high demands on a suitable process procedure. However, these high demands are not the only objection. The temperature decrease of the outer layer as the sheet becomes thicker affects the quality of the packing sheet produced.

SUMMARY OF THE INVENTION

The present invention eliminates the objections of the state of the art. It is the object of the invention to provide the possibility, even with the sensitive mixture of rubber material, fibers, and solvent used today, to operate in such a manner that the temperature of the outer surface of the layer remains uniform and equal to the temperature of the surface of the heated cylinder, independently of the thickness of the layer.

The invention solves this problem in the manner that, in addition to being heated by the heated cylinder, the layer of material on the heated cylinder is heated by heat sources directed to the outer surface of the layer.

Thereby the packing sheet calender is so arranged that around a part of the circumference of the heated cylinder, at least one heat radiating energy source is so arranged that the thus externally heated part of the circumference of the heated cylinder is heated over the entire length of the heated cylinder.

It is thereby attained that between the outer surface of the layer of material and the outer surface of the heated cylinder all of the material of the layer has the same temperature. This lightens considerably the requirements of the machine operation, the process control is simplified and it is possible to use mixtures which were not heretofore usable for the production of packing sheets. The duration of the process is shortened because the heated cylinder can have the same, or almost the same, speed of rotation throughout the entire process.

For removal of the packing sheet from the heated cylinder after the end of the production process, it is advantageous when the externally heat sources are swingable or movable away from the heated cylinder to facilitate removal of the completed packing sheet from the heated cylinder.

This can advantageously be attained by mounting the external heat sources on a swingable cover or on a movable carrier.

The movement of the external heat sources from their working position requires considerable force. It is therefore advantageous when the cover and/or the movable carrier are movable by servo motors which are pivoted on the calender stands or on the base frame.

Such a packing sheet calender is surrounded by a protective cover, in order to draw off vaporized or evaporated solvent. It is therefore advantageous when the cover and/or carrier for the external heating elements forms a part of such protective cover.

It is therefore advantageous when a cover surrounds a rear part of the heated cylinder, when a further cover or carrier surrounds the lower free part of the heated cylinder, and when a further cover or carrier surrounds an upper part of the heated cylinder.

Advantageously, electrical radiating systems, convectors, or hot air nozzles can be used as the heat sources.

It is advantageous when there is provided a switch for switching off the additional heating elements when the cylinder is stationary for cleaning and/or to prevent overheating.

It is also advantageous, when the machine control of the packing plate calender has equipment for temperature control with an arrangement for switching off the machine in the event of overheating.

Moreover, it is advantageous when there is provided a microprocessor for the control of the additional heating in dependence on the product temperature, the recipe and the temperature of the heat sources.

BRIEF DESCRIPTION OF DRAWINGS

The essence of the present invention will be more fully understood from the following description of a preferred embodiment shown schematically and by way of example in the accompanying drawings in which.

DESCRIPTION OF PREFERRED EMBODIMENTS

Figure 1:
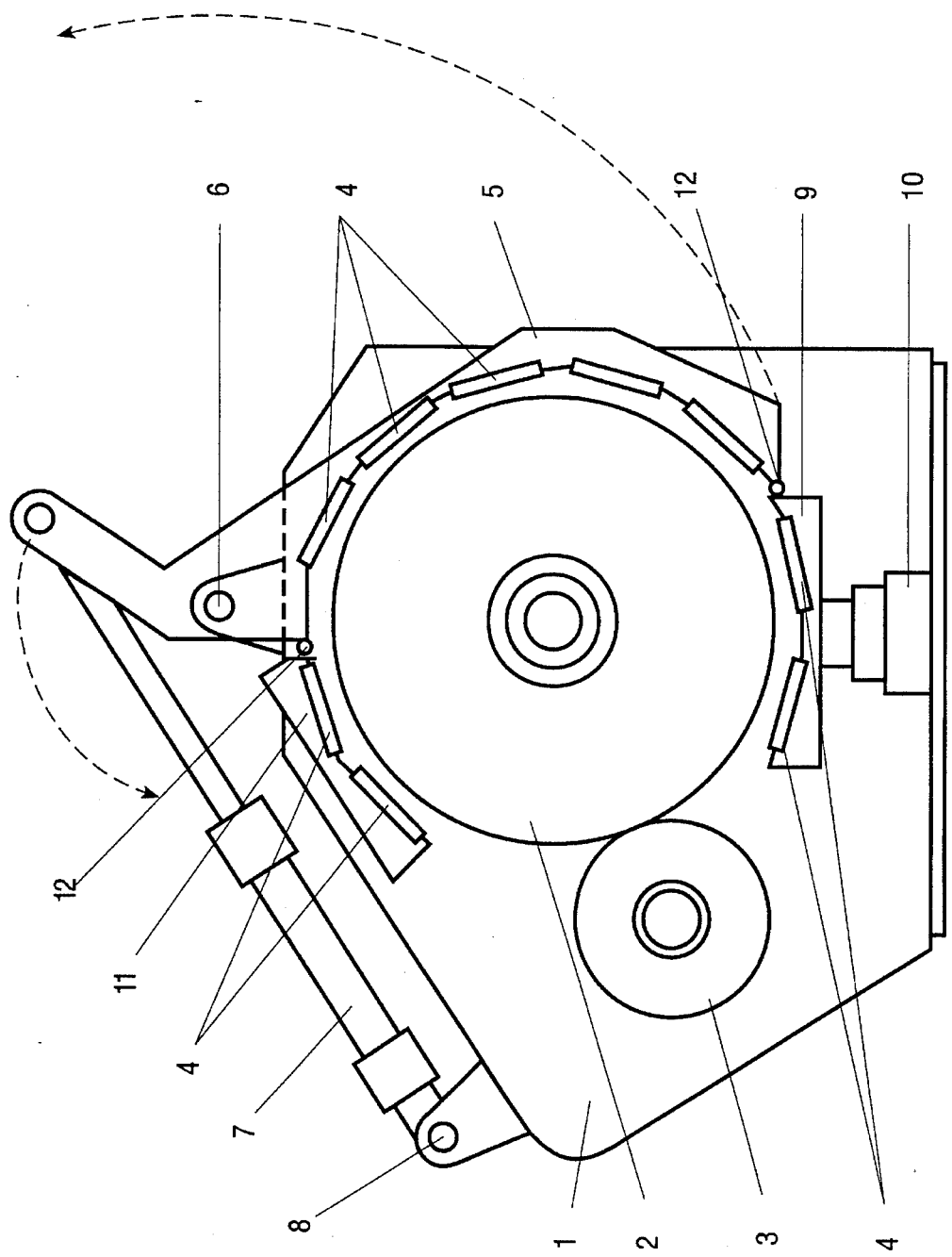
FIG. 1 is a schematic cross section of a packing sheet calender in accordance with the invention.
Figure 2:
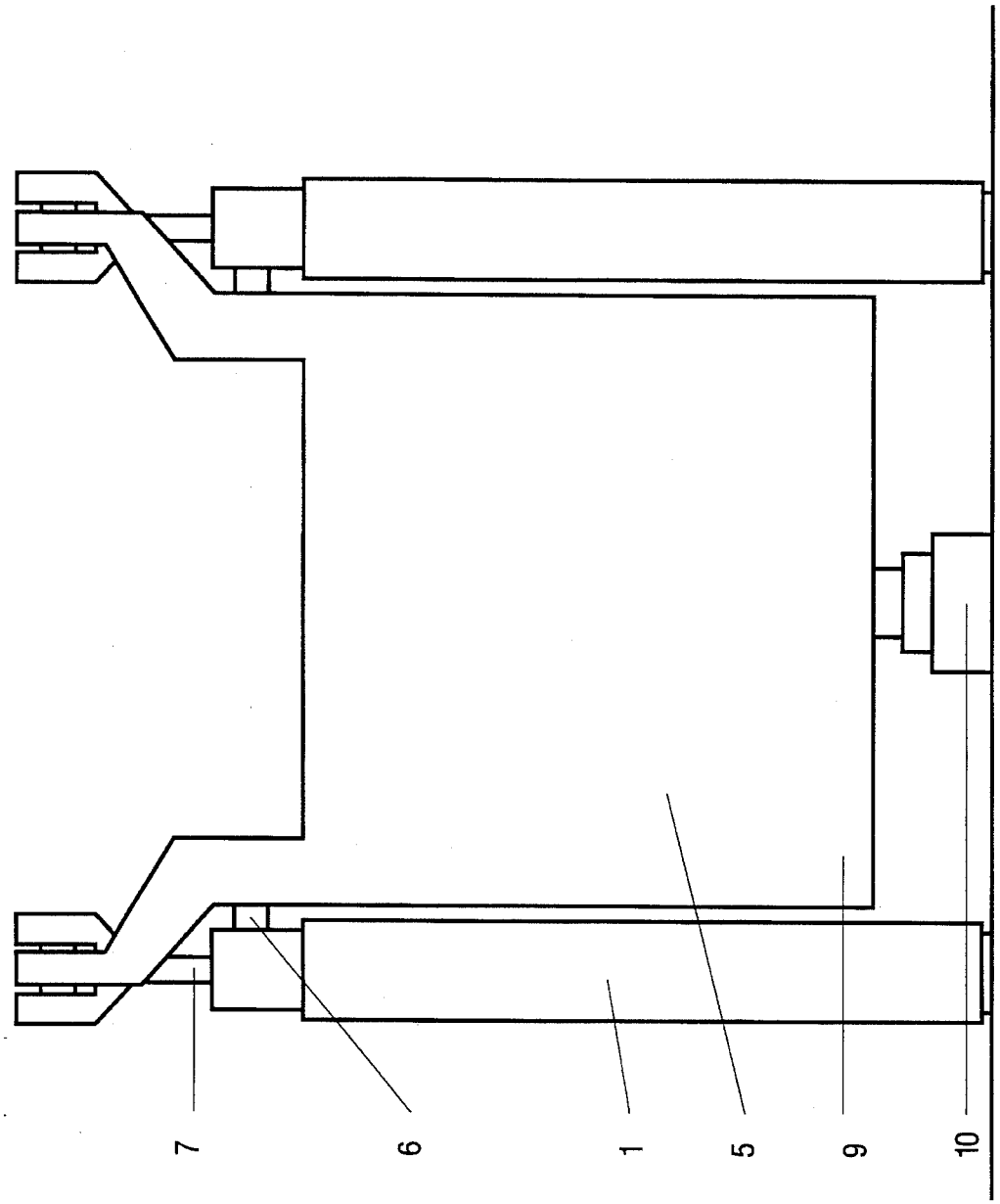
FIG. 2 is a schematic rear elevation of the calender.

The packing sheet calender shown in FIG. 1 and FIG. 2 comprises two stands 1 in which a heated cylinder 2 and an unheated pressure cylinder 3 are rotatably mounted. The heated cylinder 2 is rotatable about a stationary axis while the cylinder 3 is rotatable about an axis which is movable toward and away from the axis of the heated cylinder 1, means being provided for pressing the cylinder 3 toward the cylinder 2 to serve as a pressure roller. The heated cylinder 2 is heated in known manner through hot water under pressure. The pressure cylinder 3 is not heated, but is cooled in known manner.

In accordance with the invention, the heated cylinder 2 is partially surrounded by heat sources 4. Several heating elements 4 are mounted on an arcuate cover 5 which is swingable about a pivot 6 by means of a servo motor 7, which is swingable about a pivot point 8 on the stands 1. The servo motor 7 is shown as a cylinder-piston unit, but can also be a hydraulic, mechanical or electrical rotary motor.

Only a part of the circumference of the heated cylinder 2 is enveloped by the cover 5. There is therefore provided a carrier 9 for heat sources 4, which, with the help of a servo motor 10, can be moved into a position in the vicinity of the undersurface of the heated cylinder 2.

It can also be advantageous in this position likewise to provide as a carrier for the heating elements 4 an arcuate cover which has a pivot point below the cylinder gap and, with the heating elements 4, is swingable between an approximately horizontal position under the heated cylinder and an approximately vertical position.

Above the upper left portion of the circumference of the heated cylinder 2 there are arranged further heating elements 4 on a further carrier 11. This further carrier 11 is mounted stationary between the stands 1 of the packing sheet calender.

These three elements 5, 9 and 11 carrying the heat sources 4 are joined with one another during operation of the calender by gasket strips 12. These elements thereby form a protective hood which almost completely surrounds the heated cylinder 2 and from which the solvent vapor can be drawn.

Figure 3:
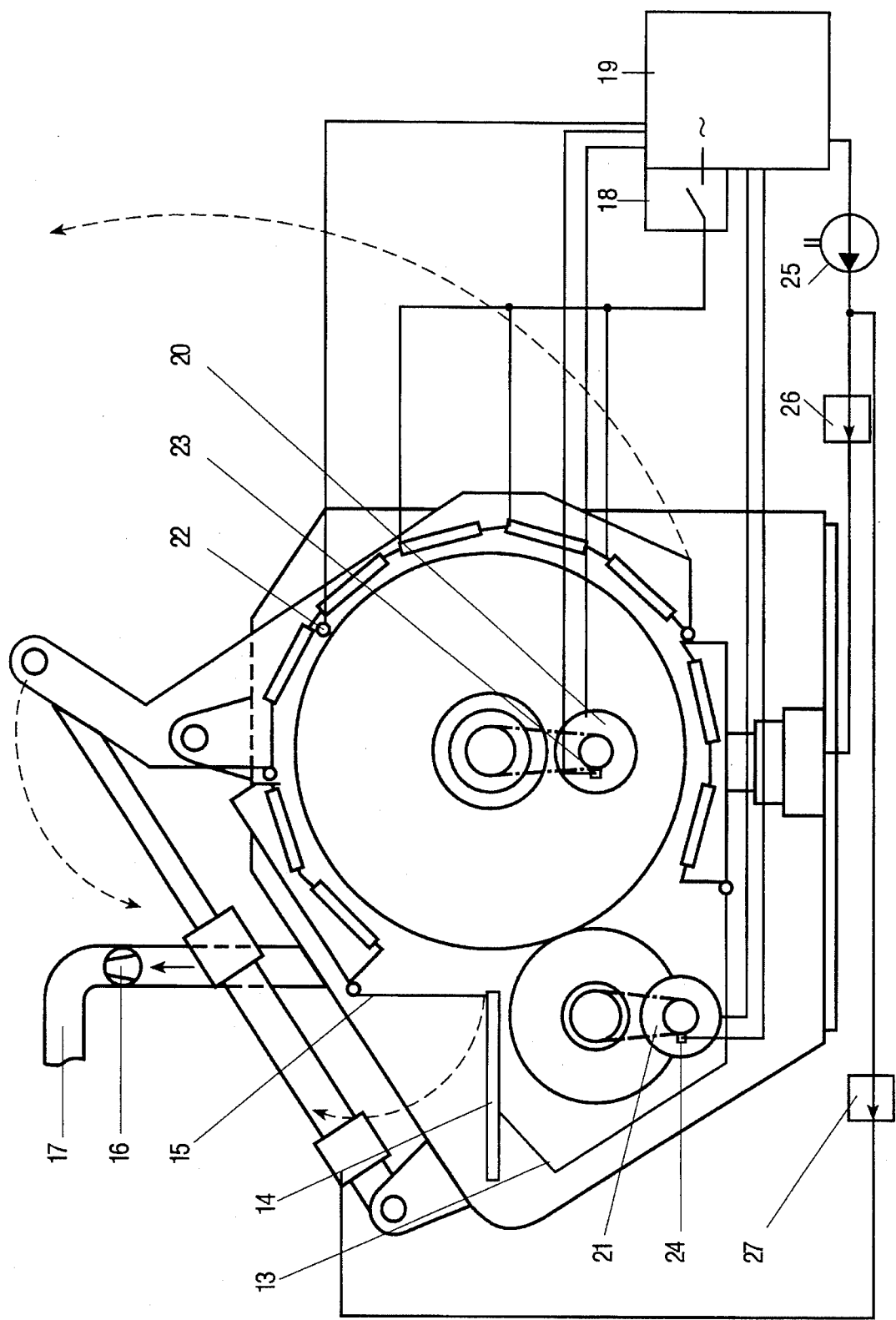
FIG. 3 is a schematic cross section of the calender showing additional elements and controls.

In FIG. 3 there are shown additional elements and controls. A stationary part 13 of the housing cooperates with the arcuate cover 5, carrier 9 and carrier 11 in enclosing the heated cylinder 2. A table 14 is provided for feeding the mixture of rubber material, fibers and solvent into the gap between the cylinders. A cover 15 is pivoted for movement between a closed position and an open position for feeding the material to the gap between the cylinders. A suction fan 16 is provided in a duct 17 for drawing off evaporated solvent from the space between the cylinders and the elements forming a cover for the cylinders.

A switch 18 controlled by a processor 19 controls the supply of energy to the heating elements 4. A heat sensor 22 is disposed in the space next to the large diameter heated cylinder for sensing the temperature of the layer of the mixture therein and is connected to the processor 19 for controlling the heat applied to the mixture.

The large-diameter cylinder 2 is driven by a variable speed motor 20 while the small-diameter unheated cylinder is driven by a variable speed motor 21. The speed of these motors is controlled by the processor 19. Moreover, the speed of rotation of the motors 20 and 21, and thus the speed of rotation of the heated cylinder and the unheated cylinder, respectively, is sensed by sensors 23 and 24 respectively, and the resulting speed signals are fed to the processor 19.

Hydraulic pressure fluid for operating the servo motor 7 for pivotally moving the cover 5 and the servo motor 10 for raising and lowering the carrier 9 of heating elements 4 is supplied by a hydraulic pump 25 under control of valves 26 and 27 respectively. The hydraulic pump 25 and the valves 26 and 27 are connected with, and controlled by, the processor 19.

What we claim is:

1. A packing sheet calender comprising calender stands, a large diameter heated cylinder rotatably supported by said calender stands for rotation about a horizontal axis, a smaller diameter unheated cylinder rotatably supported by said calender stands for rotations about an axis parallel to said axis of said large diameter heated cylinder and with a gap between said cylinders, means for driving said cylinders in rotation at selected speeds while a preformed mixture of rubber material, fibers and solvent is fed into said gap between said cylinders to form on the circumference of said large diameter cylinder a layer of increasing thickness of said mixture, and a fluid-tight protective housing containing therein said large diameter heated cylinder and said smaller diameter unheated cylinder, said housing having as a part thereof a protective cover operable to a closed position and an open position for providing access to the interior of the housing, said housing protective cover comprising an arcuate cover pivotably mounted for movement to said open position and a closed operative position partially surrounding said large diameter heated cylinder circumferentially and spaced therefrom in a radial direction, external heating means comprising a plurality of heating elements mounted on said pivotably mounted arcuate cover in positions for placing thereof circumferentially of the large diameter heated cylinder for applying heat externally of said large diameter cylinder to the surface of said mixture on the circumference of said large diameter heated cylinder during rotation of the cylinders when said cover is in said closed operative position, and said arcuate cover being dimensioned for providing access to the large diameter cylinder in said open position for removal of individual packing sheets formed from said mixture on the large diameter cylinder.

2. A packing sheet calender according to claim 1, in which said arcuate cover is pivotally mounted for pivotal movement about a horizontal pivot axis parallel to the axis of said large diameter heated cylinder between said closed operative position and said open position.

3. A packing sheet calender according to claim 2, further comprising a servo motor for moving said arcuate cover pivotally between said operative position and said open position.

4. A packing sheet calender according to claim 1, in which said external heating means comprises a carrier below said large diameter heated cylinder and at least one heating element on said carrier, said carrier being movable between a raised operative position and a lowered position.

5. A packing sheet calender according to claim 4, further comprising a servo motor for moving said carrier between said raised operative position and said lowered position.

6. A packing sheet calender according to claim 1, further comprising means for withdrawing from said housing any evaporated solvent.

7. A packing sheet calender according to claim 1, further comprising a microprocessor for controlling said external heating means and temperature sensing means for sensing the temperature of said layer of said mixture on the circumference of said large diameter heated cylinder.

* * * * *